Dec. 19, 1961          D. F. ARMOUR          3,013,308
METHOD FOR MOLDING AND ASSEMBLING DISPENSER FITMENT
Filed Oct. 8, 1957          4 Sheets-Sheet 1
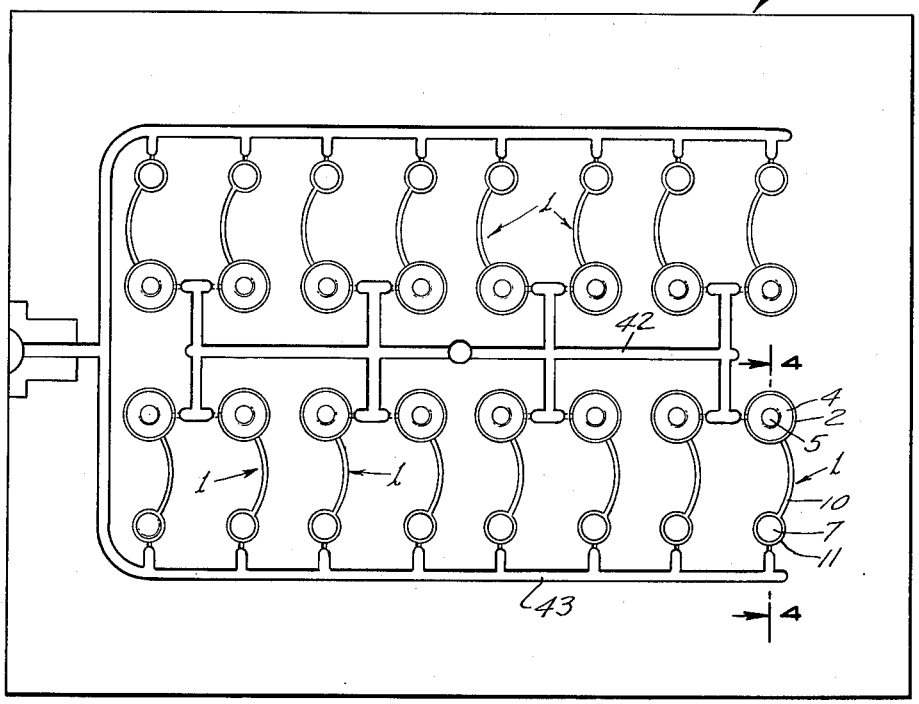
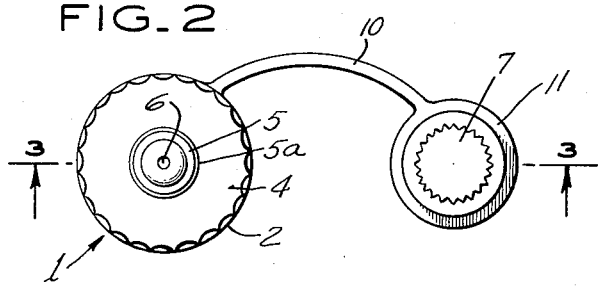
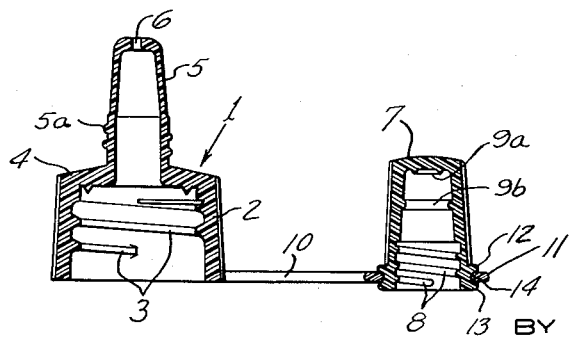
INVENTOR
DONALD F. ARMOUR
BY Bates & Willard
ATTORNEYS Dec. 19, 1961  D. F. ARMOUR  3,013,308
METHOD FOR MOLDING AND ASSEMBLING DISPENSER FITMENT
Filed Oct. 8, 1957  4 Sheets-Sheet 2
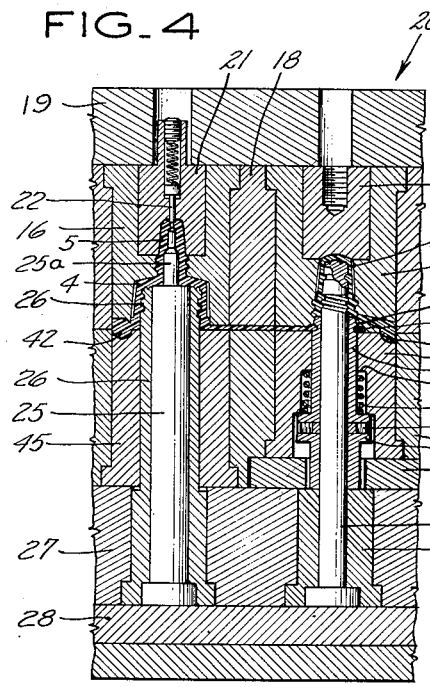
FIG_4
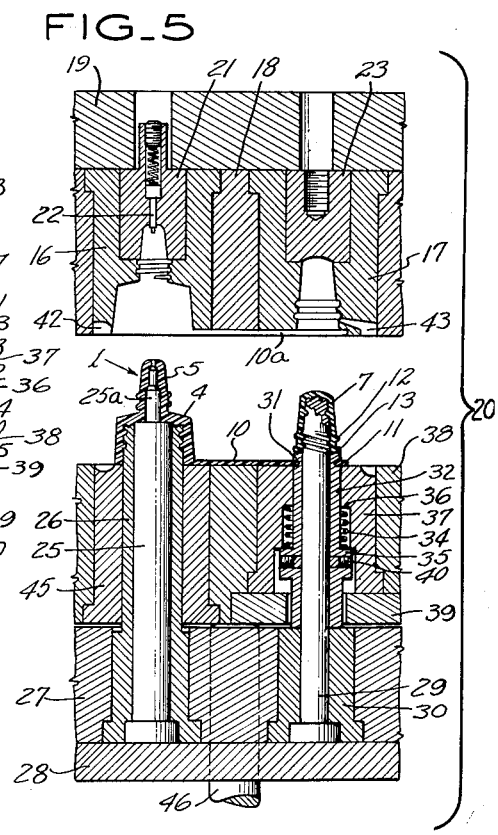
FIG_5
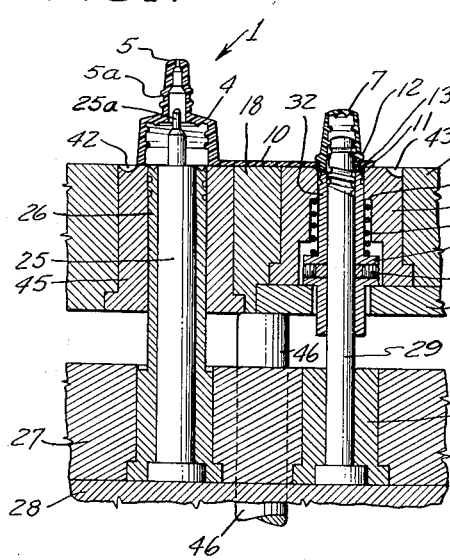
FIG_7
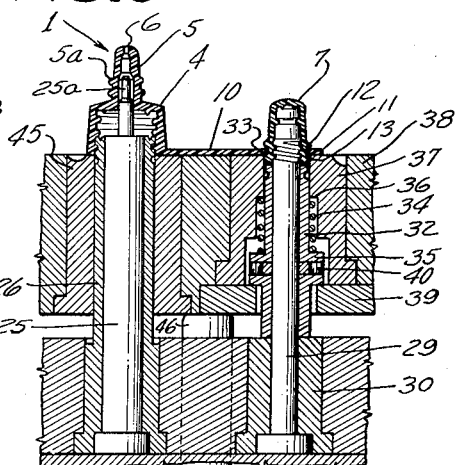
FIG_6
INVENTOR
DONALD F. ARMOUR
BY Bates + Willard
ATTORNEYS Dec. 19, 1961  D. F. ARMOUR  3,013,308
METHOD FOR MOLDING AND ASSEMBLING DISPENSER FITMENT
Filed Oct. 8, 1957  4 Sheets-Sheet 3

INVENTOR
DONALD F. ARMOUR
BY Bates & Willard
ATTORNEYS

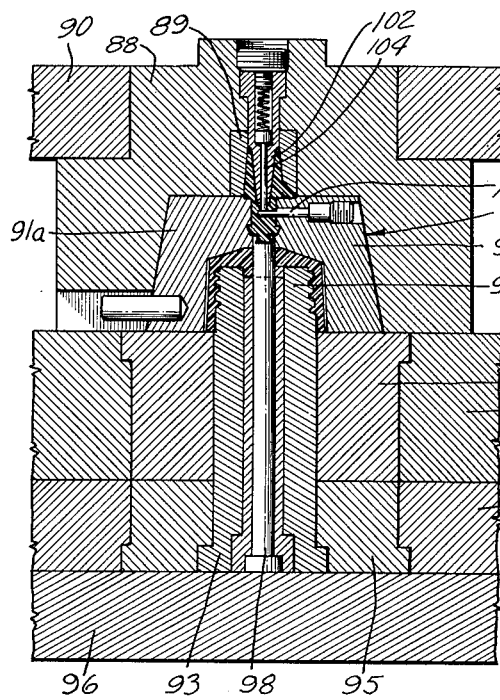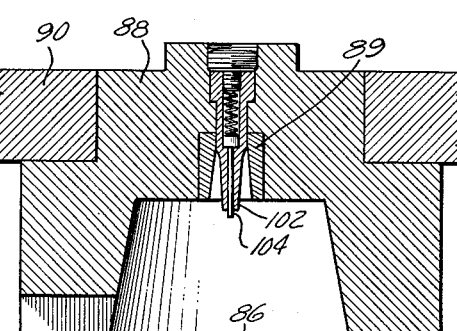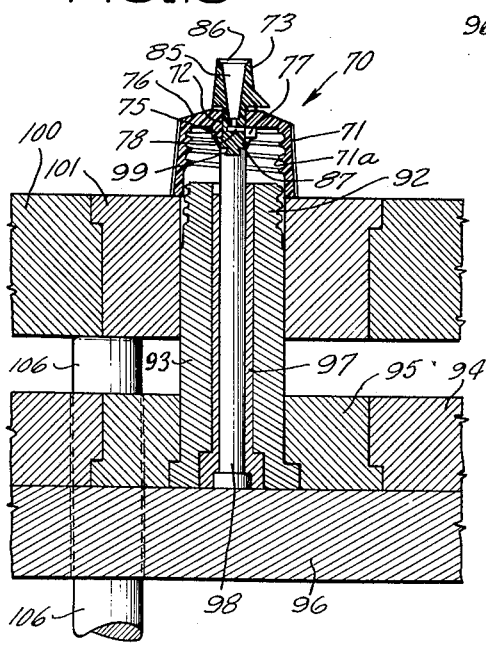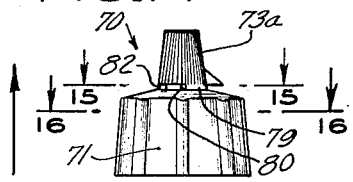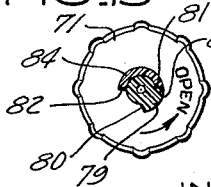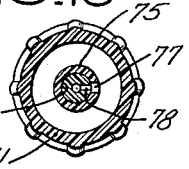

United States Patent Office 3,013,308
Patented Dec. 19, 1961

---

3,013,308
METHOD FOR MOLDING AND ASSEMBLING DISPENSER FITMENT
Donald F. Armour, Bloomfield, Conn., assignor to Plax Corporation, Bloomfield, Conn., a corporation of Delaware
Filed Oct. 8, 1957, Ser. No. 688,948
2 Claims. (Cl. 18—55)

The present invention relates to dispenser fitments and closures for containers, generally, and particularly for plastic squeeze bottles and the like and to novel method and apparatus for making the same.

Container fitments and closures embodying the invention have the advantage of remaining attached to each other while at the same time providing for movement of one relative to the other to open and close the fitment for dispensing contents of the container therethrough.

A principal object of the invention is to provide improved container fitment and closure assemblies of the character indicated in which the cap need not be removed from the dispensing fitment and if removed remains anchored to the fitment and movable relative thereto.

A further object is to provide method and apparatus for simultaneously molding the fitment and closure components of such an assembly and of automatically assembling the components while stripping the parts from the molds.

Another object is to provide process and apparatus for molding the components of different materials and assembling the mold components with the molding apparatus.

These and other objects of the invention will be apparent from a study of the following description of the several illustrative embodiments of the invention shown in the accompanying drawings in which:

FIG. 1 is a plan view of a multicavity mold for manufacturing and assembling a plurality of dispenser fitments and captive closures in accordance with a preferred embodiment of the invention;

FIG. 2 is an enlarged plan view of a dispenser fitment and closure assembly molded and assembled in the mold of FIG. 1;

FIG. 3 is a cross-sectional view of said assembly taken on line 3—3 of FIG. 2;

FIG. 4 is an enlarged cross-sectional view of the molding apparatus taken on line 4—4 of FIG. 1;

FIGS. 5, 6 and 7 are successive views of the apparatus shown in FIG. 4 illustrating the successive operations in stripping and assembling the dispenser fitment and closure;

FIGS. 11, 12 and 13 are cross-sectional views similar to FIGS. 4–7 showing successive steps in the molding, stripping and assembling of still another dispenser fitment and closure assembly in accordance with the present invention;

FIG. 14 is a side elevation view of the fitment and closure assembly molded and assembled in FIGS. 11–13;

FIG. 15 is a cross-sectional view taken on line 15—15 of FIG. 14 showing details of the dispenser and closure assembly;

FIG. 16 is a cross-sectional view taken on line 16—16 of FIG. 14 showing further details of the assembly; and FIG. 17 is an elevation view in cross section of a modification of the assembly shown in FIGS. 14–16.

Figure 8:
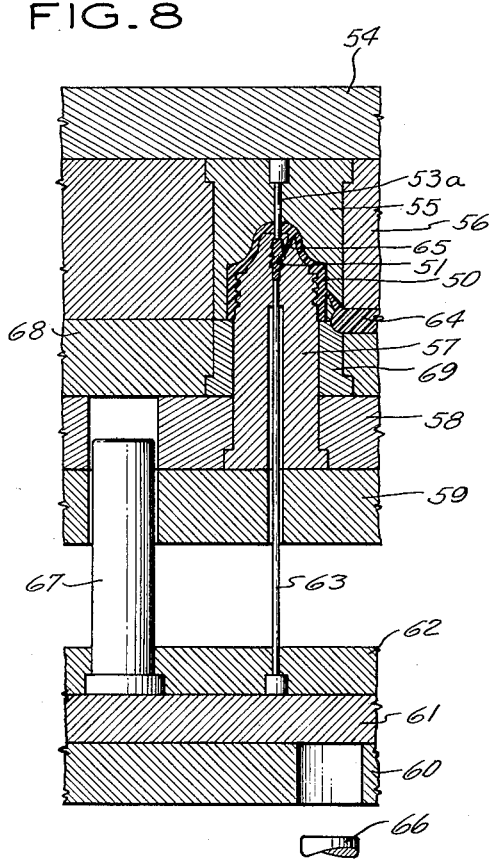
FIGS. 8, 9 and 10 are cross-sectional views, similar to FIGS. 4–7, showing successive steps in the molding, stripping and assembling of a different dispenser fitment and closure assembly.

Referring to the embodiment of the invention shown in FIGS. 2 and 3, the dispenser fitment and captive closure assembly there shown includes a fitment member, generally designated 1, for attachment to the neck or similar discharge outlet of a bottle or other container.

The member 1 includes a skirt portion 2 having internal threads 3 for removably securing the member externally on the neck of a bottle or the like. While the member 1 is illustrated as attachable externally to the threaded neck of a container, it will be understood that the invention contemplates attachment internally and by means other than threads as, for example, by a press fit or snap ring engagement.

Projecting upwardly from the top 4 of the skirted portion 2 of the member 1 is a hollow discharge nozzle member 5 having a discharge orifice 6 in its upper tip.

The illustrated orifice 6 is suitable for stream and drop-by-drop discharge of liquid and for cloud discharge of powder when the member 1 is attached to a container as, for example, a plastic squeeze bottle formed of polyethylene or other suitable resilient plastic material. It of course will be understood that the shape and internal configuration of the nozzle portion 5 and the orifice 6 may be modified and supplemented in known fashion to adapt the fitment to spray or other form of discharge as may be desired for a particular dispenser fitment.

In accordance with the present invention, the fitment 1 is provided with a closure 7 which in the embodiment shown in FIGS. 2 and 3 is a cup-shaped cap having threads 8 for detachably securing it on the nozzle 5. Internal rings 9a and 9b compressibly engage the adjacent surfaces of the nozzle to provide liquid seals therebetween. Preferably the assembly is molded of polyethylene, or other resilient material, so as to provide tight seals therebetween. While the closure 7 is illustrated in the form of a cap or hood, it will be understood that a plug or cork closure may be used and a friction fit, or other suitable means other than threads 8, may be used to detachably secure the closure in sealing engagement relative to the orifice 6 of the discharge fitment.

As shown in FIGS. 2 and 3, the cap 7 is held captive to the member 1 by an anchoring connection 10 which is molded integral with the member 1 and has a loop or ring 11 at its outer end in which the cap 7 is rotatably held by rims 12 and 13 on either side of a groove 14 in which the ring 11 is removably restrained.

While the member 1 is shown integral with the anchor strap 10, it will be understood that a connection, such as that between the strap 10 and cap 7, may be provided between members 1 and 10. In the latter event, the connection between the cap and strap may be integral, if desired. It also is contemplated that the cap be directly securable on the neck of a bottle, tube or other container, and that the anchor strap 10 have a ring securable on the container neck beneath the cap.

In every instance, however, it is contemplated that a molded member, such as member 7, shall be movably secured to another molded member, such as the loop or ring 11, and that the parts be molded concurrently and assembled by the movement of the mold parts in stripping the members from the molds.

More particularly, there is shown in FIGS. 4–7, a mold arrangement in which cavity members 16 and 17 are secured by a cavity retaining plate 18 to top clamping plate 19 of a conventional injection molding press, generally designated 20. As there shown, the cavity 16 is shaped to mold the outer configuration of the skirt 2 and lower threaded section 5a of the nozzle portion of the dispenser fitment member 1. The upper portion of the nozzle 5 is molded in a cavity insert 21 which contains a spring loaded pin 22 for molding the nozzle orifice 6.

Cavity member 17 is shaped to mold the outside wall of the cap 7 and the top and outer wall of the ring 11, the top and side walls of the anchor member 10 being molded in part by a depression 10a which is found in part in the cavity 17 and in part in the cavity 16 and the retainer plate 13, as will be apparent from inspection of FIGS. 4–7. The top of the cap 7 is shaped by a cavity insert 23 which fits in the cavity 17 sufficiently loosely to provide adequate venting in molding the cap 7 therein.

The interior of the fitment member 1 is molded by the shaped upper end 25a of a force member 25 and by the threaded upper end of a force sleeve 26 which is secured by a force retainer plate 27 to the bottom backing or clamping plate 28 of the press, the force member 25 being secured to the plate 28 by the sleeve 26.

The interior of the cap 7 is molded by force pin 29 which is secured by a bushing sleeve 30 and the force retaining plate 27 to the bottom clamping plate 28 of the press.

As shown in FIGS. 4–7, the bottom lip of the cap 7 and the inner wall of the ring 11 are molded respectively by the upper end 31 of a floating sleeve 32 and by an annular groove 33 which is spaced from the upper end 31. More particularly, the sleeve 32 is slidably mounted for limited axial movement on the force pin 29 and is biased downwardly by a spring 34 that is compressed between a sleeve flange 35 and shoulder 36 of a retaining bushing 37 that is secured in the press stripper plate 38 by a backing plate 39 through which the lower end of the sleeve 32 freely extends into abutting engagement with the upper end of the bushing 30. Preferably set screws 40 in the sleeve 32 press gently against the force pin 29 so that the two move as a unit until resistance of the sleeve 32 overcomes the drag of set screws 40 and movement occurs therebetween.

When the press and mold components are pressed closed, as shown in FIG. 4, a plastic material as for example polyethylene may be injected into the mold cavities and the members 1 and 7 molded therein. In the illustrated embodiment, provision is made for molding the two members of different materials as, for example, polyethylene of different colors. Thus, as shown in FIGS. 1 and 4, the cavities for the discharge fitments 1 are supplied from central sprue and runners 42 and the cavities for the caps 7 are supplied from outer sprue and runners 43. However, it will be understood that when desired the material to the members 1 and 7 may be supplied by a common set of runners (not shown).

In accordance with a preferred form of the present invention, the spring load on the orifice molding pin 22 is just sufficient to hold the pin 22 against the tip of the force pin 25 when plastic molding material is injected under substantial molding pressure into the cavity 16 and against said pins.

When the cavities have been filled with materials, as shown in FIG. 4, and the plastic has set, the lower clamping plate 28 is retracted, as shown in FIG. 5, so that the threaded engagement of the molded members 1 and 7 with the sleeve 26 and pin 29, respectively, strip the members from the cavities 16 and 17. Thus it is important that the engagement of the cavities 16 and 17 with the outer threads and undercut shoulders of members 1 and 7 offer less resistance to stripping than the engagement of the internal threads and molded under cuts of the members 1 and 7 with the corresponding undercuts in the molding sleeve 26 and pin 29.

Also, the latter engagement in combination with the engagement of the molded members 1, 7 and 10 with the underlying portions of the sleeves 26 and 32, the stripper plate 38 and the stripper bushings 37 and 45 serves to keep the stripper plate 38 and associated components with the bottom clamping plate 28, as shown in FIG. 5, when the latter is drawn downwardly to open the press. During the further retraction of the clamping plate 28, a stop 46 engages and prevents further retraction of the stripper plate 38 whereupon, as shown in FIG. 6, the clamping and stripper plates 28 and 38 separate and the force pin 29 draws the cap 7 downwardly so as to seat the ring 11 in the annular retaining groove 14 of the cap when the shoulder 35 of the sleeve 32 bottoms on the backing plate 39.

Concurrently, the retraction of the plate 28 also strips the force sleeve 26 from the molded discharge member 1 and further downward movement as shown in FIG. 7 also strips the force pin 29 from the cap 7 and the molded members 1 and 7 are discharged from the press as interlocking assembled units whereupon the press may be closed and the molding and assembly operations repeated.

Figure 9:
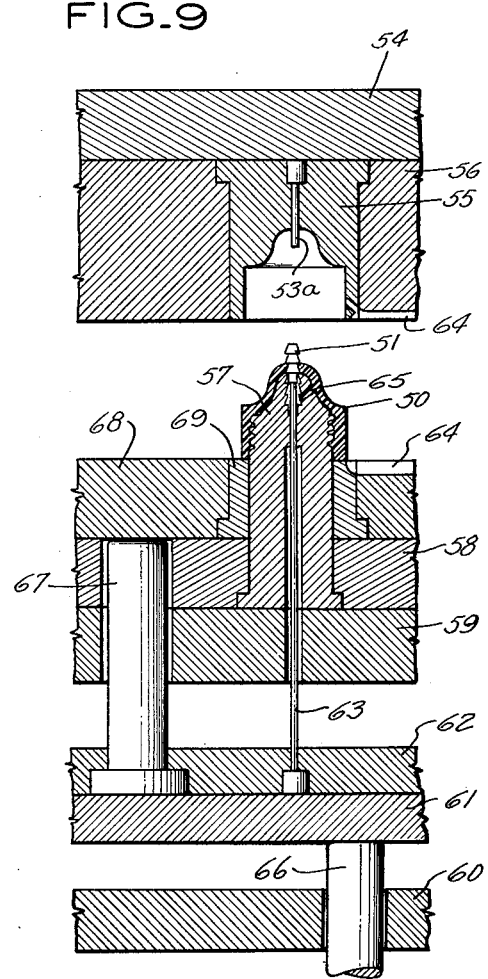
Figure 10:
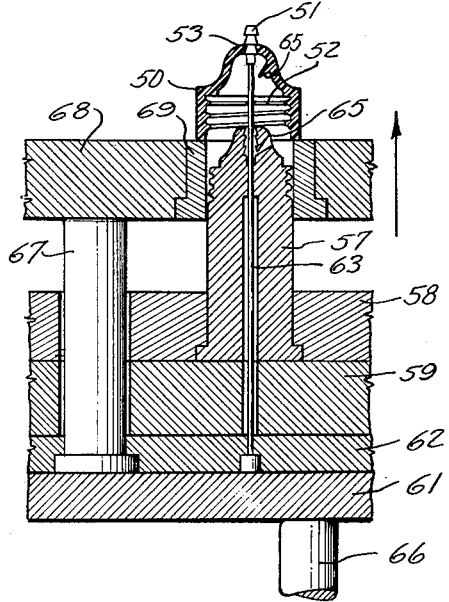

Referring to the embodiment shown in FIGS. 8, 9 and 10, a dispenser fitment 50 and stopper 51 are molded and assembled in accordance with the invention.

More particularly, the dispenser fitment 50 there shown is provided with internal threads 52 for attachment to the threaded neck of a plastic squeeze bottle (not shown) or the like and includes an orifice 53 through which may be discharged the contents of the container to which the fitment 50 is attached.

In accordance with the invention, the stopper 51 is molded concurrently with the fitment 50 and automatically inserted in the orifice 53 thereof when the stopper and fitment are stripped from the mold.

As shown in FIGS. 8, 9 and 10, the components of a suitable injection molding press for molding and assembling the members 50 and 51 preferably include a top clamping plate 54 to which cavity 55 is secured by cavity retainer plate 56. The cavity 55 is shaped to mold the external contour of the member 50, the orifice 53 of which is molded by a pin 53a secured to the top clamping plate 54 by the cavity.

The interior of the member 50 is molded by a force member 57 which is secured by a force retaining plate 58 to a clamping plate 59 that is spaced from and movable as a unit with the lower press clamping plate 60 to which the plate 59 is secured.

Secured to a floating press plate 61, as by a retainer plate 62, is an inner force pin 63 which extends upwardly through the plate 59 and force member 57. The upper end of the pin 63 forms a portion of a molding cavity within the force member 57 in which the stopper 51 is molded. The top of the molding cavity is defined by the bottom of the orifice pin 53a and is shaped to mold a stopper 51 which preferably has a plurality of alternating annular shoulders and grooves which are shaped to facilitate presing the stopper 51 upwardly into the orifice in the top of the fitment 50 and to assure a liquid-tight seal therebetween.

As shown in FIG. 8, molding material, such as polyethylene, is introduced into the cavity 55 through runner 64 to mold the fitment 50 therein. Molding material also flows from the fitment cavity through a runner 65 into the molding cavity in the force member 57 to form the stopper 51. When the material has sufficiently cooled or otherwise set in the molded shape, the bottom clamping plate 60 is drawn downwardly to open the press, as shown in FIG. 9. During the downward travel, the floating plate 61 and pin 63 move with the plate 60 until the plate 61 engages a stop 66. Further downward movement of the plate 59 causes the pin 63 to force the stopper 51 up into the fitment orifice, as shown in FIG. 9. When the stopper 51 is properly seated in the orifice, a stop 67 on the plate 61 arrests further downward movement of the stripper plate 68, bushing 69 of which thereupon strips the fitment 50 and assembled plug 51 from the force member 57, as shown in FIG. 10.

In the embodiment illustrated in FIGS. 11–16, a fitment and closure assembly generally designated 70 is molded and thereafter assembled by the mold stripping operation. As shown in the drawings, the assembly 70 includes a cap member 71 having internal threads 71a for attachment to the neck of a container, such as a plastic squeeze bottle (not shown) and a discharge outlet 72 in which a molded discharge nozzle member 73 is secured for limited rotary movement between open and closed positions relative to the fitment 71. More particularly, an axially disposed cylindrical internal flange 75 extends downwardly about the outlet orifice 72 from the top wall 76 of the fitment. As shown in FIGS. 13 and 16, a portion of the flange 75 is cut away so as to provide an opening 77 through which liquid content may be discharged when the nozzle 73 is turned in the fitment to align radial passageway 78 with the opening 77. When the nozzle 73 is turned in the opposite direction, communication of the passageway 78 with the interior of the fitment 71 is blocked by the flange 75 and the fitment closed. An arcuate annular shoulder 79 on the nozzle member 73 provides radial stop surfaces 80 and 81 which engage aligned abutment surfaces 82 and 83, respectively, at the ends of a semi-circular annular rim 84 that projects upwardly about the orifice 72 from the top surface 76 of the fitment and limit rotation of the nozzle member 73 to movement between the open and closed positions in the fitment.

A flared passage 85 communicates with and extends upwardly through the nozzle member 73 from the passage 78 and terminates in a discharge orifice 86 at the top. Preferably, the portion of the nozzle 73 outside and above the fitment 71 is serrated, as shown at 73a in FIG. 14, to facilitate turning of the nozzle manually to the open and closed positions. As shown in FIG. 13, an annular flange 87 is provided to underlie the sleeve 75 and together with the engagement of nozzle shoulder surfaces with the top surfaces of the fitment 71 restrain the nozzle for limited angular rotation in the fitment.

As in the case of the embodiments shown in FIGS. 1–10, the components 71 and 73 of the assembly 70 are molded concurrently and assembled by the movement of the mold parts in stripping the members from the molds.

More particularly, as shown in FIGS. 11–13, a mold arrangement may be employed in which a cavity member 88 and a cavity insert 89 are secured to top clamping plate 90 of an injection molding press. As there shown, the cavity insert 89 is shaped to mold the outer configuration of the upper serrated portion 87 of the nozzle component 73 of the dispenser fitment assembly 70. The outer configuration of the lower portion of the nozzle 73 and the member 71 are molded in a split cavity insert 91 comprising the insert halves 91a and 91b.

The threaded interior of the fitment member 71 is molded by the shaped upper end 92 of a force member 93 which is secured by a force retainer plate 94 and bushing 95 to a bottom backing or clamping plate 96 of the press.

The bottom of the internal sleeve 75 and the opening 77 therein are molded by the conforming upper end of a sleeve 97 within the force 93.

The passageway or bore through the sleeve 75 in which the lower end of die nozzle 73 is rotatably journaled is molded by a force pin 98 which is secured by the sleeve 97 to the bottom clamping plate 96 of the press.

As shown in FIGS. 11–13, the bottom of the nozzle member 73 is molded by the upper end of the force pin 98 and preferably is molded so as to provide an interlocking connection 99 with which the nozzle member 73 is drawn into the member 71 and journaled in the sleeve 75.

Located between the cavity 88 and the clamping plate 96 is a floating stripper plate 100 having a stripper bushing 101 through which the force 93 slidably projects and the upper surface of which molds the bottom lip of the fitment member 71.

The flared discharge passage 85 in the nozzle 73 is molded by a pin 102, the upper end of which is secured in the cavity 88 and the lower end of which projects downwardly into the cavity insert 89. As shown in FIG. 11, the tip of the pin 102 projects almost into engagement with the side wall of a pin 103, the tip of which projects inwardly from the split insert half 91b in which the pin is secured.

Preferably the pin 102 has an axial bore in which a spring loaded needle 104 is slidably retained so that the tip of the needle engages the pin 103 when the press and mold components are closed, as shown in FIG. 11.

As there shown, plastic material such as for example polyethylene may be injected into the mold cavities and the members 71 and 73 concurrently molded therein.

The spring load on the molding needle pin 104 is just sufficient to hold the tip of the needle 104 against the side of the pin 103 when plastic molding material is injected under substantial molding pressure to mold the nozzle member 73.

When the cavities have been filled with materials, as shown in FIG. 11, and the plastic has set, the lower clamping plate 96 is retracted, as shown in FIG. 12, so that the connection 99 between the pin 98 and nozzle member 73 strips the member 73 from the cavity insert 89 and withdraws the split cavity insert 91 from the cavity 88. Thereafter, the halves 91a and 91b of the split insert 91 are opened in the direction of the arrows (FIG. 12). Further downward movement of the stripper plate 100 is arrested by a stop 106 so that as the press plate 96 is drawn downward, the pin 98 draws the nozzle member 73 into the fitment sleeve 75 and concurrently the fitment 71 is stripped from the force 93. When the nozzle member 73 is snugly journaled against the top 76 of the fitment, the pin 98 is stripped from the nozzle member 71 and the fitment assembly 70 is ready for attachment and use on a squeeze bottle or other container.

The embodiment illustrated in FIG. 17 is generally similar to that shown in FIGS. 11–16 save that a spray discharge is effected by the fitment which is generally designated 109 through a side orifice 110 and side spray shield 111 for an eye cup or throat spray.

More particularly the fitment 109 includes a skirt portion 112 having internal threads 113 for removably securing the fitment on the neck of a bottle or the like.

Projecting upwardly from the top of the skirted portion 112 is a sleeve portion 114 in which a manually operable valve member 115 is rotatably journaled.

The valve member 115 has a central passageway 115a in which a tube 116 is securely pressed. The tube 116 is adapted to project into liquid within a squeeze bottle (not shown) or the like to which the fitment may be attached. A groove 117 along the passageway 115a provides a passage for directing air from within the bottle to the top of the tube 116 where the air mixes with liquid which is forced upwardly in the tube by squeezing the bottle and the mixture is discharged as a spray through the orifice 110 and the shield 111.

The upper portion of the valve member 115 may be manually gripped and turned so as to block the orifice 110 with the sleeve wall 114 and thereby effectively close the fitment orifice.

As shown in FIG. 17, the shield 111 preferably includes a side opening 111a for relieving pressure within the shield when the main opening 111b is pressed against the eye lid about an eye ball and an atomized spray discharged thereat from the orifice 110.

The molding and assembly of the components 112 and 115 of the fitment 109, in accordance with the invention, is effected in substantially the same manner and with substantially similar molding and assembly equipment as that illustrated and heretofore described with reference to FIGS. 11–13.

While a number of embodiments of the invention are illustrated and described, it will be understood that various additional embodiments and modifications are contemplated and will be apparent within the scope of the claims.

I claim:

1. A method of molding and assembling a pair of interlockable members into an assembly in which one member is rotatable relative to the other, which method comprises: molding a first member in a first separate molding cavity to form a circular opening in a portion thereof, molding concurrently a second member in a second separate molding cavity spaced from and in axial alignment with said circular opening in said first member, forming, during the molding of said second member, axially spaced shoulders thereon of greater diameter than said opening and defining a groove therebetween of a diameter less than that of said opening, and, simultaneously, stripping said members from the mold cavities, and forcing said second member from said second separate molding cavity axially into said opening to position said groove within said opening thereby interlockingly engaging the first member with the second member.

2. A method of molding and assembling a plastic dispenser fitment member having an anchoring connection and a closure member to be held by said anchoring connection which method comprises: molding said fitment member in a first separate molding cavity to form a circular opening through said anchoring connection, molding said closure member in a second separate molding cavity spaced above and in axial alignment with said opening, forming, during the molding of said closure member, axially spaced shoulders thereon of greater diameter than said opening and defining a groove therebetween of about the diameter of said opening, stripping said members from their individually separate mold cavities, while simultaneously drawing said closure member axially into said opening to position said groove within said opening.

References Cited in the file of this patent

UNITED STATES PATENTS

| | | |
|---|---|---|
| 1,633,197 | Snyder | June 21, 1927 |
| 2,034,799 | Crain | Mar. 24, 1936 |
| 2,217,661 | Anderson | Oct. 15, 1940 |
| 2,306,205 | Crosman | Dec. 22, 1942 |
| 2,477,368 | Gits | July 26, 1949 |
| 2,495,884 | Beyers | Jan. 31, 1950 |
| 2,569,174 | Kardorff | Sept. 25, 1951 |
| 2,630,601 | Schiffer et al. | Mar. 10, 1953 |
| 2,705,955 | Nesset et al. | Apr. 12, 1955 |
| 2,724,867 | Smith | Nov. 29, 1955 |
| 2,875,472 | Marcus | Mar. 3, 1959 |

FOREIGN PATENTS

| | | |
|---|---|---|
| 75,994 | Denmark | June 1, 1953 |
| 1,039,555 | France | Dec. 29, 1954 |
| 1,133,258 | France | Nov. 12, 1956 |
| 747,466 | Great Britain | Apr. 4, 1956 |